United States Patent [19]
Berry

[11] 3,796,888
[45] Mar. 12, 1974

[54] SWITCH STRUCTURE

[76] Inventor: Norman H. Berry, 49 Cambridge, Pleasant Ridge, Mich. 48069

[22] Filed: Sept. 5, 1972

[21] Appl. No.: 286,128

[52] U.S. Cl. ............... 307/10 SB, 200/85 A, 337/1
[51] Int. Cl. .............................................. H02g 3/00
[58] Field of Search ........... 200/85; 337/99, 101, 1; 307/10 R, 10 SB, 118, 149

[56] References Cited
UNITED STATES PATENTS
3,703,618  11/1972  Lewis ............................... 200/85 A
3,124,957  3/1964  Bungo ................................. 337/101

*Primary Examiner*—Herman J. Hohauser
*Attorney, Agent, or Firm*—Whittemore, Hulbert & Belknap

[57] ABSTRACT

A bimetal, pressure actuated switch which when placed between the springs and cushioning material of an automobile seat or the like will be actuated by a person having approximately the same weight under extremes of temperature, said switch comprising an insulating base having a contact member thereon, a bimetal spring secured to the base and extending over the contact member, cover means movable toward the base and into contact with the bimetal spring for urging the bimetal spring into engagement with the contact member, and resilient means supporting the cover in spaced relation to the base.

13 Claims, 5 Drawing Figures

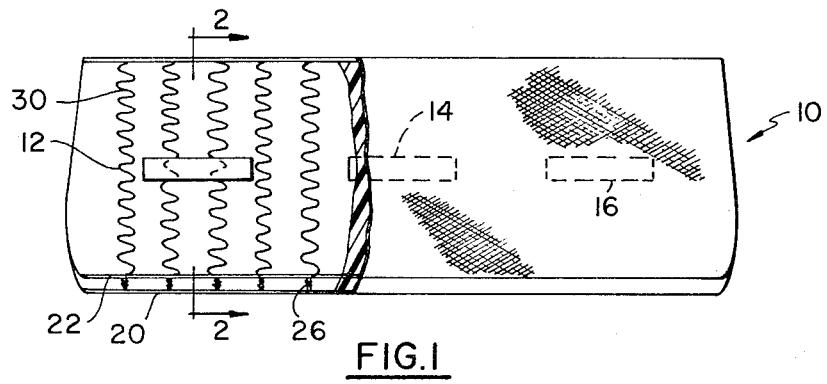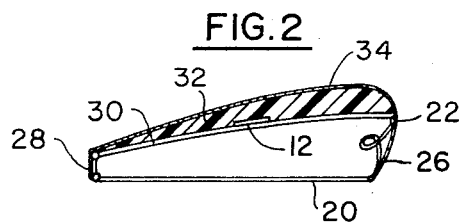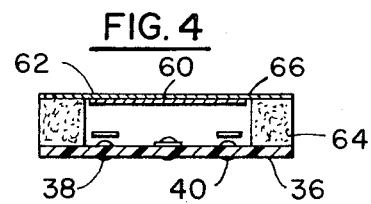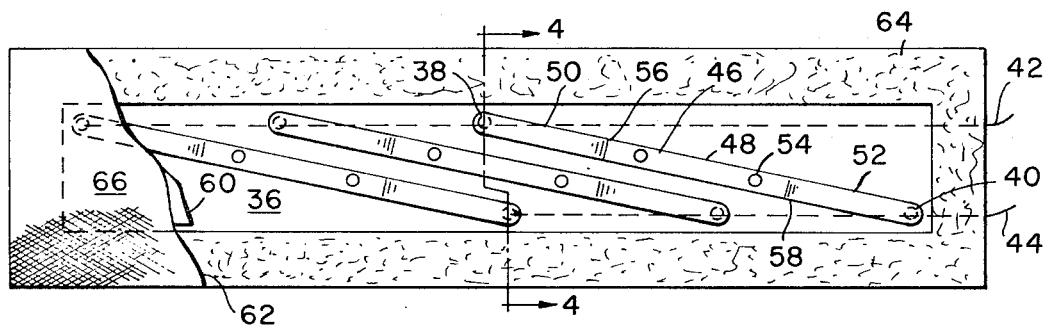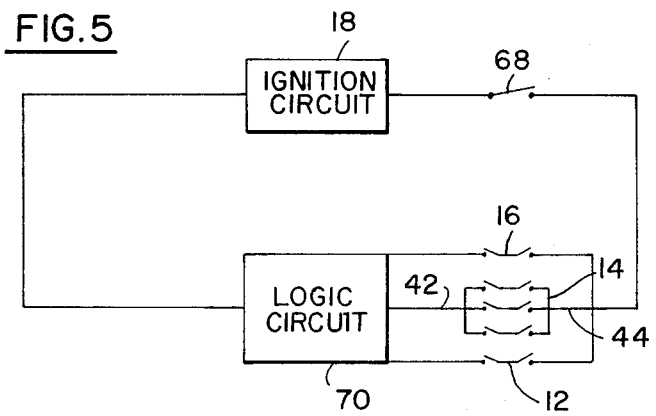

SWITCH STRUCTURE

BACKGROUND OF THE INVENTION

1. Field of the Invention

The invention relates to switch structure and refers more specifically to a switch positioned in automobile seat structure operable to prevent closing the ignition circuit of the automobile with a person sitting in a predetermined position on the automobile seat unless predetermined ignition circuit logic is satisfied.

2. Description of the Prior Art

In the past, seat belts have been provided in automobiles as a safety feature. Many people, however, do not fasten the seat belts and therefore do not make use of the provided safety feature. It has been proposed that a switch be placed in the seat belt structure so that the ignition circuit of the automobile cannot be closed unless the buckles of the seat belt are buckled. With such structure, however, it would be possible for passengers to buckle the seat belts without using them, thereby again circumventing the safety feature of the seat belts.

In conjunction with attempts to prevent bypassing of such safety features, logic circuits, making use of pressure responsive, seat mounted switches, have been developed which are intended to prevent closing of the ignition circuit of an automobile with passengers seated on predetermined portions of the automobile seat without logic such as seat belts being fastened being satisfied. However, prior pressure switches have not been sufficiently sensitive so that over extremes of temperature, for example, between −40° F. to +165° F., the weight of a person of, for example, 40 pounds, will always close the seat switch to permit closing of the automobile ignition switch and thus operation of the automobile.

SUMMARY OF THE INVENTION

In accordance with the invention, there is provided a switch for use in automobile seats and for connection in the ignition circuit of the automobile operable to prevent closing of the ignition circuit of the automobile unless a predetermined weight is positioned on the seat over the switch. The switch of the invention is temperature compensated so that the switch will operate over extreme temperature ranges with a minimum weight positioned on the seat.

In particular, the switch comprises an elongated plastic base adapted to be positioned lengthwise of an automobile seat between the springs and cushioning material thereof having contact members secured thereto and a bimetal spring positioned over the contact members, which contact members and spring are connected in series in the ignition circuit. The switch further includes a cover movable toward and away from the base to urge the spring into contact with the contact members and the resilient structure positioned between the base and cover for holding the cover in spaced relation with respect to the base.

BRIEF DESCRIPTION OF THE DRAWINGS

FIG. 1 is a partially broken away plan view of automobile seat structure including switches constructed in accordance with the invention positioned therein.

FIG. 2 is a cross section of the seat structure illustrated in FIG. 1, taken substantially on the line 2—2 of FIG. 1.

FIG. 3 is an enlarged, partly broken away top view of one of the switch structures illustrated in FIG. 1.

FIG. 4 is a section view of the switch structure illustrated in FIG. 3, taken substantially on the line 4—4 of FIG. 3.

FIG. 5 is a partly schematic, partly block diagram of a representative automobile ignition circuit including the seat switches of the invention shown in FIG. 1.

DESCRIPTION OF THE PREFERRED EMBODIMENTS

As shown best in FIG. 1, the automobile seat cushion 10 includes three separate switch structures 12, 14 and 16 constructed in accordance with the invention. The switches 12, 14 and 16 prevent completing of the ignition circuit 18, as shown best in FIG. 5, without a predetermined weight positioned over the switch structures on the cushion 10.

The seat cushion 10, as shown in FIGS. 1 and 2, includes a rectangular, lower wire frame 20, an upper rectangular wire frame 22 separated by the spring members 26, shaped as shown best in FIG. 2, and the wire members 28. The cushion 10 is completed by foamed rubber or other suitable foamed plastic or the like 32 positioned over the springs 30. Suitable upholstery material 34 is provided over the foamed cushioning material 32.

Such seats are well known in the automobile industry and include a variety of spring wire frames and cushioning materials.

Seat cushions so constructed have the property of compressing more in warm weather than in cold weather. This is particularly true of the cushioning material 32. This feature of present automobile seat cushions has in the past prevented the inclusion in the seat cushions of pressure switches, since prior pressure switches installed in such seat cushions have not been operable with a predetermined weight positioned on the cushions at the switch with ambient temperatures in extreme ranges of, for example, −40° F. to +165° F.

The switches 12, 14 and 16 are, however, especially constructed to be actuated when positioned as shown in FIGS. 1 and 2 between the springs 30 and cushioning material 32 in the automobile seat cushion 10 at the usual place of passengers sitting on the seat cushion by passengers having a predetermined minimum weight of, for example, 40 pounds, and with the ambient temperature variable over the indicated temperature range.

The switch 14, for example, as shown best in FIGS. 3 and 4 includes a rectangular, relatively rigid insulating base 36 which may, for example, be nylon and may be two inches by nine inches.

The base 36 has the electrical contacts 38 and 40 positioned thereon in predetermined locations, as indicated best in FIG. 3. The contacts 38 and 40 are connected to the electrical conductors 42 and 44 by convenient means such as solder or the like. The base 36 may be countersunk, if desired, to permit flush soldering of the conductors 42 and 44 to the contacts 38 and 40.

Bimetal springs 46 which have a central portion 48 and end portions 50 and 52 are secured to the base 36 by convenient means such as rivets 54. As shown, the ends 50 and 52 of the bimetal springs 46 are bent away from the base 36 at, for example, the points 56 and 58 to space the ends of the bimetal springs from the contact members 38 and 40.

With such spring structure, a predetermined force will be required to cause the ends 50 and 52 of the bimetal spring members 46 to contact the contact members 38 and 40, respectively, and thus complete a circuit through conductors 42 and 44.

Further, with such bimetal springs 46, which are common articles of commerce, it requires a different amount of force to bring the ends 50 and 52 thereof into engagement with the contacts 38 and 40 at different temperatures and the ends of the springs 46 will be positioned variably from the contact members 38 and 40 in accordance with the temperature of the bimetal springs. Thus, for example, at −40° F., the ends of the bimetal springs 46 may be spaced 0.050 of an inch from the contact members 38 and 40, while at +165° F., the ends of the springs 46 may be spaced 0.100 of an inch from the contacts 38 and 40. The force necessary to engage the ends 50 and 52 of the bimetal springs 46 with the contact members 38 and 40 at the two extremes of temperature and at any temperature between would vary.

A cover 66 which in the example shown includes a rectangular paper derivative member 60 secured to relatively flexible tape 62 is positioned on the foamed rubber or other resilient foamed material 64 extending about the periphery of the base and cover 36 and 66, respectively, as shown in FIGS. 3 and 4.

In operation, with the switch 14 installed as shown in FIG. 1 and without a passenger positioned over the switch 14, none of the parallel portions of the switch 14 are closed since the ends of the bimetal springs 46 are separated from the contacts 38 and 40. On a passenger sitting in the vehicle over the switch 14 having a minimum weight of, for example, 40 pounds, the ends of the bimetal springs 46 contact the contacts 38 and 40 and complete the circuit through the switch 14.

When the temperature varies as, for example, when the temperature becomes the lower limit of −40° F., the seat structure is particularly rigid so that the forty pound passenger appears to be a force of 20 pounds to the bimetal springs 46. However, the force necessary to move the bimetal springs 46 into contact with the contacts 38 and 40 is equivalently reduced in conjunction with the movement of the ends 50 and 52 of the bimetal springs 46 toward the contacts 38 and 40 in accordance with the movement of the bimetal members subjected to extremely cold temperatures.

Thus, it will be seen that the switch 14 is temperature reponsive so as to compensate for temperature changes to facilitate closing the switch 14 while the passenger is seated over the switch 14 at either of the extremes of temperature and between the extremes of temperature due to the continually variable distance of the bimetal spring ends with respect to the contacts 38 and 40 and the different force required to bring the ends of the bimetal springs 46 into engagement with the contacts 38 and 40.

It will be noted that the switch 14 has three separate bimetal springs therein and that the circuit is closed only if both ends of any one bimetal spring contacts the contact members 38 and 40. Thus, a person sitting over the switch 16 could not close the switch 14 by placing his hand on the seat over the switch 14, due to the length of the individual bemetal members. The three bimetal springs are positioned in the switch 14 to provide required actuation of the switch 14, while only a single bimetal member is required in the switches 12 and 16 as reflected in FIG. 5.

While a particular material such as nylon plastic and a particular bimetal spring such as a Chace 2400 bimetal spring, foamed rubber and a paper derivatives and flexible tape have been indicated above, it will be understood that other materials may be used within the scope of the invention. Thus, for example, the base may be wood or other insulating material, the cover may be of a thin metal or the like, and the foamed rubber may be other foamed plastic material or springs, if desired. It is not intended to limit the invention to the particular materials specified above.

In FIG. 5, a representative overall circuit including the switches 12, 14 and 16 is shown for descriptive purposes. Thus, the switches 12, 14 and 16 are shown in parallel with each other and in series with an ignition switch 68, a logic circuit 70, and the ignition circuit 18 previously indicated. The diagram shown in FIG. 5 is not intended to be a complete electrical schematic of an automobile ignition circuit since such circuits are well known, and the particular logic circuit 70 may be varied for different automobiles and with different manufacturers to provide various safety interlocks with the ignition circuit. In fact, to provide one operable circuit, the logic circuit 70 could be dispensed with entirely and the circuit of FIG. 5 including the switches 12, 14 and 16 would prevent operation of an automobile due to the ignition switch not being closed even though the ignition switch 68 were closed without a passenger in at least one of the positions indicated on the eat cushion 10 by the switches 12, 14 and 16. The development of any particular logic circuit 70 is not part of the present invention.

While one embodiment of the present invention has been considered in detail, it will be understood that other embodiments and modifications are contemplated by the inventor. It is, therefore, intended to include all the embodiments and modifications of the invention as are defined by the appended claims within the scope of the invention.

What I claim as my invention is:

1. Switch structure comprising a relatively rigid base having at least one electrical contact secured thereto, a second contact member supported above the first contact member at a distance and with a force representative of temperature, cover means movable toward the base for contacting the second contact member and moving it into contact with the first contact member and resilient means for supporting the cover in spaced relation to the base with a force variable with temperature in a manner inversely related to the force supporting the second contact member above the first contact member whereby substantially the same weight positioned on the cover of the switch will activate the switch at all operating temperatures.

2. Structure as set forth in claim 1 wherein the second contact member is a bimetal spring.

3. Structure as set forth in claim 1 including a plurality of first and second contact members connected in parallel.

4. Structure as set forth in claim 3 wherein the second contact members are elongated bimetal springs, the base is an elongated rectangle, the bimetal springs are secured to the base centrally thereof and extend away from the base at the ends thereof over associated first contact members, the cover means is relatively flexible paper and the resilient means is a foamed material positiones about the periphery of the rectangular base between the base and cover means.

5. An automobile seat cushion including springs and cushioning material positioned on the springs, a seat switch positioned on the automobile seat cushion between the springs and cushioning material comprising a relatively rigid base having at least one electrical contact secured thereto, a second contact member supported above the first contact member at a distance and with a force representative of temperature, cover means movable toward the base for contacting the second contact member and moving it into contact with the first contact member and resilient means for supporting the cover in spaced relation to the base with a force variable with temperature in substantially the same manner as the cushioning material and in a manner inversely related to the force supporting the second contact member above the first contact member whereby substantially weight positioned on the cover of the switch will activate the switch at all operating temperatures, and a logic circuit and an automobile ignition circuit in series with the seat switch.

6. Structure as set forth in claim 5 wherein there are three seat switches spaced across the automobile seat cushion at the two ends and centrally thereof each of which is connected in parallel with the others and in series with the logic circuit and the automobile ignition circuit.

7. Structure as set forth in claim 6 wherein the seat switch located centrally includes a plurality of parallel portions.

8. Structure as set forth in claim 5 wherein the second contact membver is a bimetal spring.

9. Structure as set forth in claim 5 including a plurality of first and second contact members connected in parallel.

10. Structure as set forth in claim 5 wherein the second contact members are elongated bimetal springs, the base is an elongated rectangle, the bimetal springs are secured to the base centrally thereof and extend away from the base at the ends thereof over associated first contact members, the cover means is relatively flexible paper and the resilient means is a foamed material positioned about the periphery of the rectangular base between the base and cover means.

11. Switch structure comprising a generally rectangular, relatively rigid, electrically insulating base having at least two electrical contacts secured thereto in spaced apart relation longitudinally of the rectangular base, an elongated bimetal spring contact member having a substantially flat portion centrally thereof secured to the base member in surface to surface contact therewith and having end portions inclined with respect to the base diverging outwardly from the base and terminating over the contact members, which bimetal spring has a spring rate which is variable in accordance with temperature, a cover positioned over the base with the contacts and bimetal spring between the cover and the base which cover is movable toward the base for contacting the bimetal spring and moving the ends thereof into contact with the contact members, and resilient means positioned between the cover and base supporting the cover from the base with a force variable with temperature in a manner inversely related to variation in the spring rate of the bimetal spring in response to variation in temperature whereby a predetermined weight placed on the cover will cause the ends of the bimetal spring to engage the contacts without regard to temperature.

12. Structure as set forth in claim 11 wherein the switch includes a plurality of additional pairs of contact members spaced apart longitudinally of the base and a cooperating additional bimetal spring for each pair of contact members whereby a plurality of parallel circuits are provided through the switch.

13. Structure as set forth in claim 11 wherein the switch is positioned between the springs and cushioning material of an automobile seat with the base positioned on the springs and wherein the cushioning material is substantially the same as the resilient means supporting the cover from the base of the switch.

* * * * *